(12) United States Patent
Chang et al.

(10) Patent No.: US 10,417,476 B2
(45) Date of Patent: Sep. 17, 2019

(54) EXPOSURE TIME DETERMINATION METHOD FOR IMAGE SENSING OPERATION

(71) Applicant: EOSMEM Corporation, Zhubei, Hsinchu (TW)

(72) Inventors: Chu-Hsin Chang, Hsinchu (TW); Ju-Yu Yu, Chupei (TW); Ping-Cheng Hou, Chupei (TW); Chun-Fu Lin, Chupei (TW); Hui-Min Tsai, Taipei (TW)

(73) Assignee: EOSMEM CORPORATION, Zhubei, Hsinchu (TW)

( * ) Notice: Subject to any disclaimer, the term of this patent is extended or adjusted under 35 U.S.C. 154(b) by 117 days.

(21) Appl. No.: 15/858,656

(22) Filed: Dec. 29, 2017

(65) Prior Publication Data

US 2018/0189540 A1    Jul. 5, 2018

Related U.S. Application Data

(60) Provisional application No. 62/440,746, filed on Dec. 30, 2016.

(30) Foreign Application Priority Data

Aug. 30, 2017    (TW) .............................. 106129519 A

(51) Int. Cl.
*G06K 9/00* (2006.01)
*H04N 5/235* (2006.01)
*G06K 9/62* (2006.01)

(52) U.S. Cl.
CPC ......... *G06K 9/0004* (2013.01); *G06K 9/6212* (2013.01); *H04N 5/2351* (2013.01);
(Continued)

(58) Field of Classification Search
CPC ......... G06K 2009/0006; G06K 9/0004; G06K 9/6212; H04N 5/2353; H04N 5/2356
See application file for complete search history.

(56) References Cited

U.S. PATENT DOCUMENTS 5,832,102 A * 11/1998 Uchida ............... G06K 9/00067
382/124
2005/0169506 A1 * 8/2005 Fenrich .............. G06K 9/00026
382/127

(Continued)

*Primary Examiner* — Bhavesh M Mehta
*Assistant Examiner* — Ian L Lemieux
(74) *Attorney, Agent, or Firm* — Tung & Associates

(57) ABSTRACT

An exposure time determination method for image sensing operation includes: providing a first stage exposure condition which includes a first exposure time; sensing an image according to the first stage exposure condition to generate a first histogram which has a first histogram brightness maximum, a first histogram brightness minimum, and a first histogram width; increasing or decreasing the first exposure time to a second exposure time as a second stage exposure condition, and sensing the image according to the second stage exposure condition to generate a second histogram which has a second histogram brightness maximum, a second histogram brightness minimum, and a second histogram width; comparing the first histogram width with the second histogram width to generate a comparison result, and determining a third exposure time to be a third stage exposure condition according to the comparison result; and sensing the image according to the third stage exposure condition.

12 Claims, 7 Drawing Sheets

(52) U.S. Cl.
CPC ......... *H04N 5/2353* (2013.01); *H04N 5/2356* (2013.01); *G06K 2009/0006* (2013.01)

(56) References Cited

U.S. PATENT DOCUMENTS

| | | | | |
|---|---|---|---|---|
| 2009/0086046 | A1* | 4/2009 | Reilly | H04N 5/2353 348/222.1 |
| 2009/0309963 | A1* | 12/2009 | Ogihara | G02B 21/365 348/79 |
| 2012/0014570 | A1* | 1/2012 | Abe | G06K 9/00067 382/124 |
| 2014/0205193 | A1* | 7/2014 | Umezu | H04N 5/2355 382/169 |

\* cited by examiner

EXPOSURE TIME DETERMINATION METHOD FOR IMAGE SENSING OPERATION

CROSS REFERENCE

The present invention claims priority to U.S. 62/440,746, filed on Dec. 30, 2016 and claims priority to TW 106129519 filed on Aug. 30, 2017.

BACKGROUND OF THE INVENTION

Field of Invention

The present invention relates to an exposure time determination method; particularly, it relates to such exposure time determination method which determines an exposure time according to a histogram of an image brightness signal.

Description of Related Art

Generally, in an optical fingerprint identification system, it often happens that the brightness of a fingerprint image is too high or too low, causing the fingerprint image unclear, and affecting the accuracy of fingerprint identification. The problem that the brightness of the fingerprint image is too high or too low is usually caused by improper exposure time during image sensing operation, i.e., exposure time too long or too short. Therefore, optimizing the exposure time is important because this will affect the accuracy of fingerprint identification.

In view of the above, to overcome the drawback in the prior art, the present invention proposes an exposure time determination method during image sensing operation, wherein an exposure time is determined according to a histogram of an image brightness signal.

SUMMARY OF THE INVENTION

From one perspective, the present invention provides an exposure time determination method for image sensing operation, comprising: S1: providing a first stage exposure condition which includes a first exposure time; S2: sensing an image according to the first stage exposure condition, and generating a first histogram according to brightness distribution and pixel counts of different brightness scales of the image, and determining a first histogram brightness maximum, a first histogram brightness minimum, and a first histogram width according to the first histogram, wherein the first histogram width is a total number of brightness scales having a pixel count exceeding a count threshold between the first histogram brightness maximum and the first histogram brightness minimum; S3: increasing or decreasing the first exposure time to a second exposure time as a second stage exposure condition, and sensing the image according to the second stage exposure condition, to generate a second histogram and determining a second histogram brightness maximum, a second histogram brightness minimum, and a second histogram width according to the second histogram, wherein the second histogram width is a total number of brightness scales having a pixel count exceeding the count threshold between the second histogram brightness maximum and the second histogram brightness minimum; S4: comparing the first histogram width with the second histogram width to generate a comparison result, and determining a third exposure time to be a third stage exposure condition according to the comparison result; and S5: sensing the image according to the third stage exposure condition.

In one preferable embodiment, in the step S3, the first exposure time is decreased to the second exposure time as the second stage exposure condition, and in the step S4, when the comparison result shows that the second histogram width is not less than the first histogram width, the third exposure time is determined to be positively correlated to an operation result of: subtracting the second histogram brightness minimum from a histogram target to obtain a difference, dividing the difference by the histogram target to obtain a quotient, and multiplying the quotient by the second exposure time to generate the operation result.

In one preferable embodiment, in the step S3, the first exposure time is decreased to the second exposure time as the second stage exposure condition, and in the step S4, when the comparison result shows that the second histogram width is less than the first histogram width, and the second histogram brightness maximum is not larger than a histogram target, the third exposure time is determined to be positively correlated to an operation result of: dividing the histogram target by the second histogram brightness maximum to obtain a quotient, and multiplying the quotient by the second exposure time.

In one preferable embodiment, in the step S3, the first exposure time is decreased to the second exposure time as the second stage exposure condition, and in the step S4, when the comparison result shows that the second histogram width is less than the first histogram width, and the second histogram brightness maximum is larger than a histogram target, the third exposure time is determined to be positively correlated to an operation result of: dividing the histogram target by a sum of the second histogram brightness minimum and the second histogram width to obtain a quotient, and multiplying the quotient by the second exposure time.

In one preferable embodiment, in the step S3, the first exposure time is increased to the second exposure time as the second stage exposure condition, and in the step S4, when the comparison result shows that when the second histogram width is less than the first histogram width, the third exposure time is determined to be positively correlated to an operation result of: subtracting the second histogram brightness minimum from a histogram target to obtain a difference, and dividing the difference by the histogram target to obtain a quotient, and multiplying the quotient by the second exposure time.

In one preferable embodiment, in the step S3, the first exposure time is increased to the second exposure time as the second stage exposure condition, and in the step S4, when the comparison result shows that the second histogram width is not less than the first histogram width, and the second histogram brightness maximum is not larger than a histogram target, the third exposure time is determined to be positively correlated to an operation result of: dividing the histogram target by the second histogram brightness maximum to obtain a quotient, and multiplying the quotient by the second exposure time.

In one preferable embodiment, in the step S3, the first exposure time is increased to the second exposure time as the second stage exposure condition, and in the step S4, when the comparison result shows that the second histogram width is not less than the first histogram width, and the second histogram brightness maximum is larger than a histogram target, the third exposure time is determined to be positively correlated to an operation result of: dividing the histogram target by a sum of the second histogram brightness minimum and the second histogram width to obtain a quotient, and multiplying the quotient by the second exposure time.

In one preferable embodiment, the step S1 includes: S101: sensing the image by a predetermined initial exposure condition which includes a condition of a light source current and a condition of an initial exposure time, to generate an initial histogram brightness maximum, an initial histogram brightness minimum, and an initial histogram width; S102: when the initial histogram brightness maximum is less than a first predetermined brightness scale, and the light source current is not increased to a light source current upper limit, increasing the light source current as an updated initial exposure condition to sense the image, so as to update the initial histogram brightness maximum, the initial histogram brightness minimum, and the initial histogram width; S103: repeating the step S102, until the initial histogram brightness maximum is not less than the first predetermined brightness scale or the light source current is increased to the light source current upper limit; S104: when the light source current is increased to the light source current upper limit and the initial histogram brightness maximum is less than the first predetermined brightness scale, and the initial exposure time is not increased to an exposure time scale upper limit, increasing the initial exposure time as an updated initial exposure condition to sense the image, so as to update the initial histogram brightness maximum, initial histogram brightness minimum, and initial histogram width; S105: repeating the step S104, until the initial histogram brightness maximum is not less than the first predetermined brightness scale or the initial exposure time is increased to the exposure time scale upper limit; S106: when the initial histogram brightness minimum is larger than a second predetermined brightness scale, and the initial exposure time is not decreased to an exposure time scale lower limit, decreasing the initial exposure time as an updated initial exposure condition to sense the image, so as to update the initial histogram brightness maximum, initial histogram brightness minimum, and initial histogram width; S107: repeating the step S106, until the initial histogram brightness minimum is not larger than the second predetermined brightness scale or the initial exposure time is decreased to the exposure time scale lower limit; S108: when the initial exposure time is decreased to the exposure time scale lower limit, and the initial histogram brightness minimum is larger than the second predetermined brightness scale, and the light source current is not decreased to a light source current lower limit, decreasing the light source current as the updated initial exposure condition to sense the image, so as to update the initial histogram brightness maximum, initial histogram brightness minimum, and initial histogram width; S109: repeating the step S108, until the initial histogram brightness minimum is not larger than the second predetermined brightness scale or the light source current is decreased to the light source current lower limit; and S110: when the steps S103, S105, and S109 are completed, using the updated initial exposure condition as the first stage exposure condition.

In one preferable embodiment, the exposure time determination method further comprises: at a first time point, sensing the image by at least one moving check pixel of a sensor device with the third stage exposure condition, to obtain at least one first brightness scale of the at least one moving check pixel; at a second time point after the first time point, sensing the image by the at least one moving check pixel of the sensor device with the third stage exposure condition, to obtain at least one second brightness scale of the at least one moving check pixel; and determining a moving stability according to the at least one first brightness scale and the at least one second brightness scale.

In the aforementioned embodiment, the exposure time determination method further comprises: determining the moving stability according to a sum of absolute differences of a plurality of the first brightness scales and a plurality of the second brightness scales.

In one preferable embodiment, both the first predetermined brightness scale and the second predetermined brightness scale are equal to a predetermined middle brightness scale in a sensible range of a sensor device.

In one preferable embodiment, the exposure time determination method further comprises: determining to increase or decrease the first exposure time according to the first histogram brightness maximum and a histogram target in the step S3.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
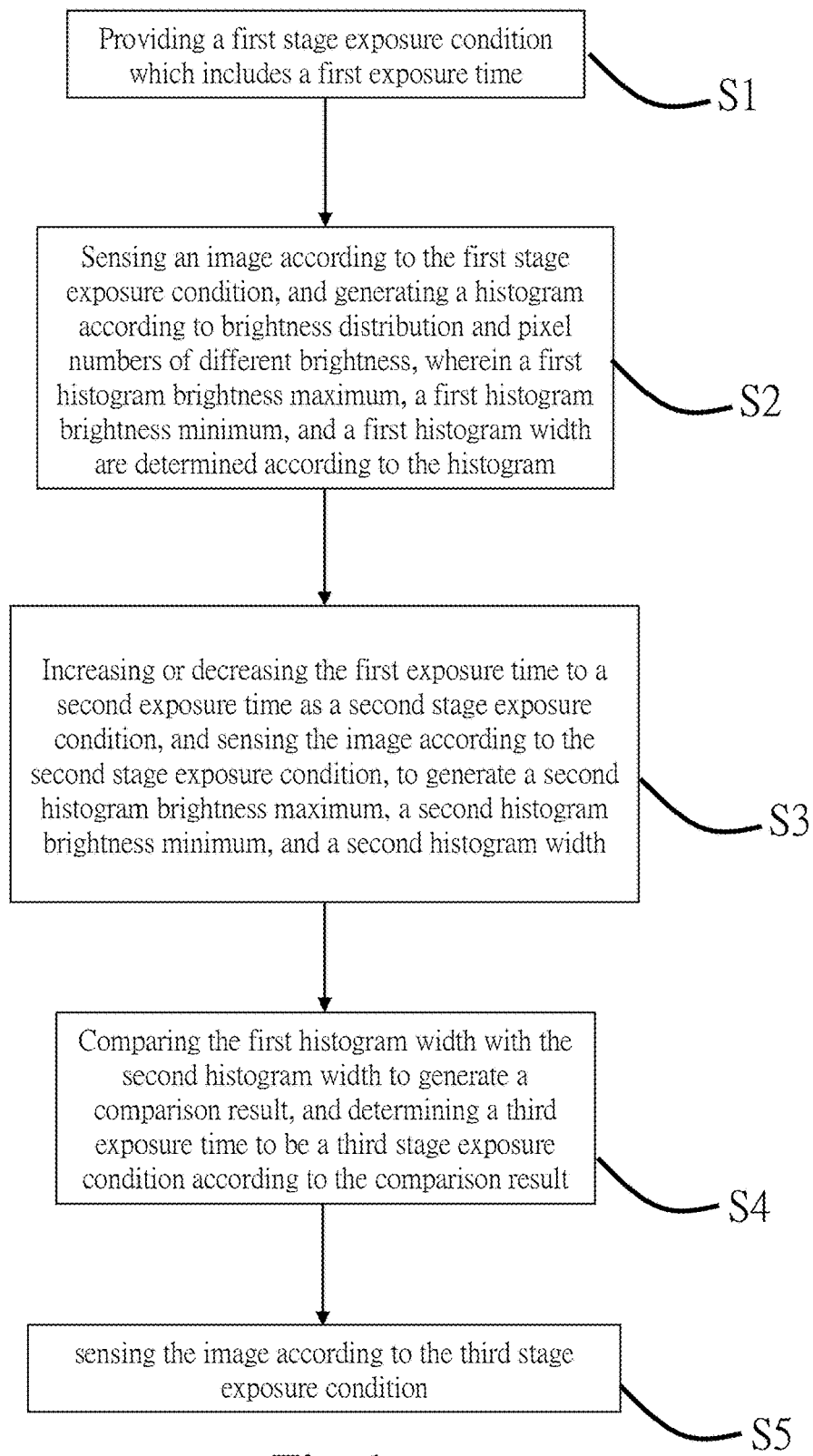
FIG. 1 is a flowchart showing an exposure time determination method according to the present invention.

Please refer to FIG. 1, which is a flowchart showing an exposure time determination method according to the present invention. The flowchart includes steps of:

S1: providing a first stage exposure condition which includes a first exposure time;

S2: sensing an image according to the first stage exposure condition, and generating a first histogram according to brightness distribution and pixel counts of different brightness scales of the image, and determining a first histogram brightness maximum, a first histogram brightness minimum, and a first histogram width according to the first histogram, wherein the first histogram width is a total number of brightness scales having a pixel count exceeding a count threshold between the first histogram brightness maximum and the first histogram brightness minimum;

S3: increasing or decreasing the first exposure time to a second exposure time as a second stage exposure condition, and sensing the image according to the second stage exposure condition, to generate a second histogram and determining a second histogram brightness maximum, a second histogram brightness minimum, and a second histogram width according to the second histogram, wherein the second histogram width is a total number of brightness scales having a pixel count exceeding the count threshold between the second histogram brightness maximum and the second histogram brightness minimum;

S4: comparing the first histogram width with the second histogram width to generate a comparison result, and determining a third exposure time to be a third stage exposure condition according to the comparison result; and S5: sensing the image according to the third stage exposure condition.

According to the exposure time determination method of the present invention, first, the first stage exposure condition which includes the first exposure time is provided. In one embodiment, this first exposure time may be determined by a pre-process, which will be described in detail later. Next, the image is sensed according to the first stage exposure condition, and a first histogram of image brightness is generated thereby. The first histogram brightness maximum, the first histogram brightness minimum, and the first histogram width are determined according to the first histogram. Next, the first exposure time is increased or decreased to the second exposure time as the second stage exposure condition, and the image is sensed according to the second stage exposure condition, to generate a second histogram. The second histogram brightness maximum, the second histogram brightness minimum, and the second histogram width are determined according to the second histogram. Next, the first histogram width is compared with the second histogram width to generate the comparison result, and the third exposure time is determined according to the comparison result; the third exposure time is used as the third stage exposure condition. The image is sensed according to the third stage exposure condition.

Figure 2A:
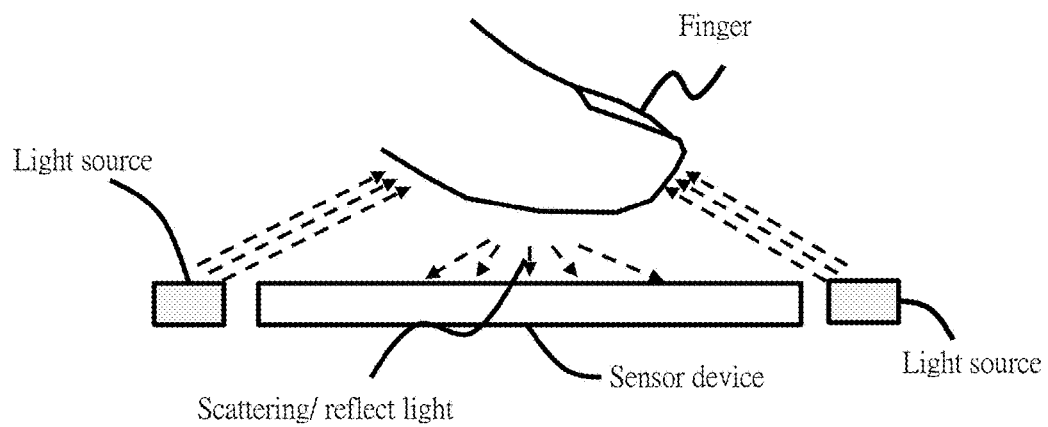
FIGS. 2A-2C shows a first embodiment of the present invention.
Figure 2B:
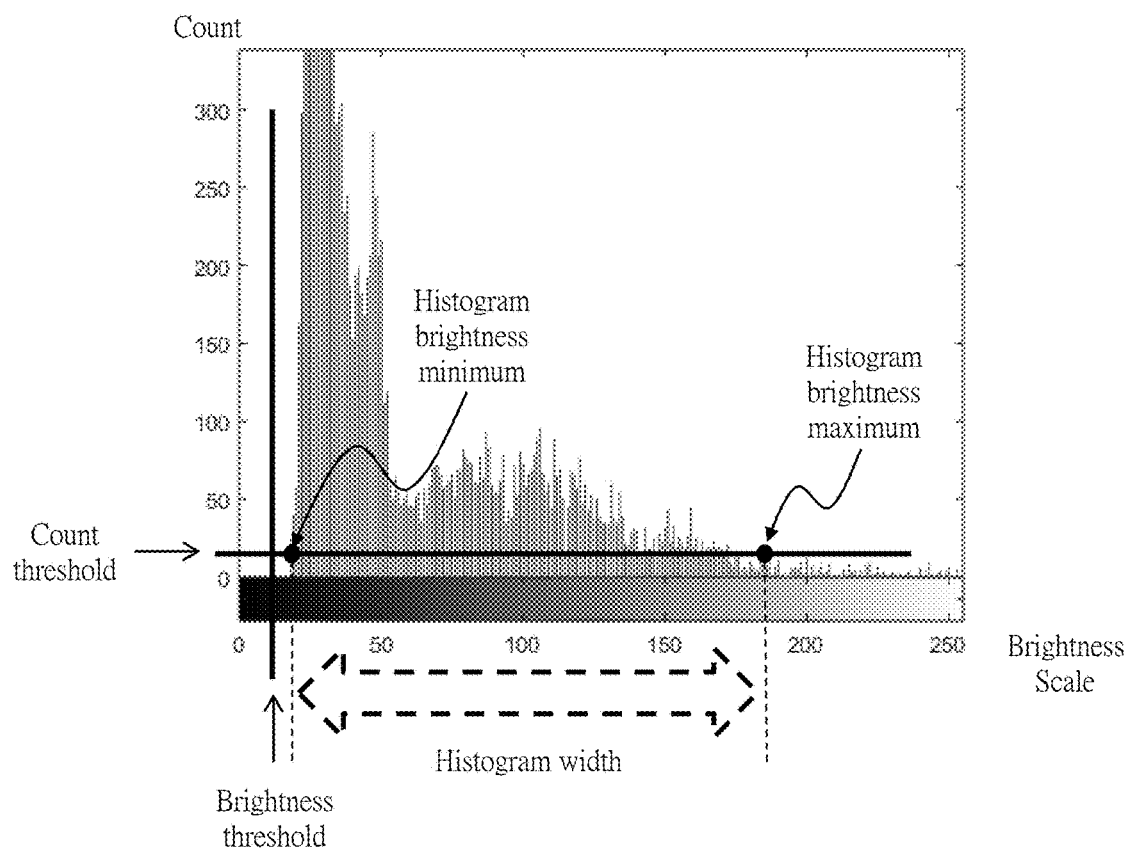
Figure 2C:
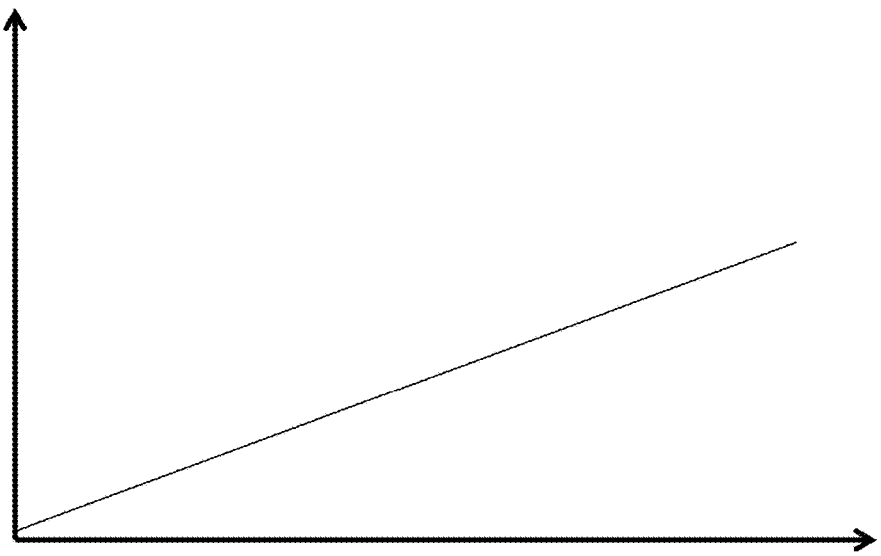

FIG. 2A-2C shows a first embodiment of the present invention, to illustrate the present invention by a practical example. As shown in FIG. 2A, a sensor device is provided to sense a fingerprint image. Light sources are provided, which are for example but not limited to light emitting diode (LED) devices, and for example located nearby two sides of the sensor device. When the LED devices emit light to a finger, the light scatters, refracts, and reflects in the finger to generate the image of a fingerprint image. The method of generating the fingerprint image is known as "light finger". The sensor device senses the fingerprint image the result is for example used in identity authentication, etc. Note that, in different embodiments, it can be arranged so that the finger contacts or does not contact the sensor device directly, or, the finger may contact a translucent material above the sensor device. In FIG. 2A, the finger does not directly contact the sensor device, which shows only one example and in another embodiment, the finger can directly contact the sensor device. The sensor device senses the fingerprint image to generate the first histogram of the image brightness as indicated in FIG. 2B.

The histogram shown in FIG. 2B is for illustrating the histogram brightness maximum, the histogram brightness minimum, and the histogram width from the histogram; the histogram shown in FIG. 2B may be the first histogram or other histograms, such as the second histogram or a third histogram, etc. In the histogram shown in FIG. 2B, the lateral axis indicates the brightness scale, and the vertical axis indicates the pixel count. The histogram brightness maximum, the histogram brightness minimum, and the histogram width are obtained from the histogram for example by steps including: providing a predetermined count threshold; among all the brightness scales whose pixel count exceeds the predetermined count threshold, determining the highest brightness scale as the histogram brightness maximum; among all the brightness scales whose pixel count exceeds the predetermined count threshold, determining the lowest brightness scale as the histogram brightness minimum; and counting every brightness scale between the histogram brightness minimum and the histogram brightness maximum, wherein if the pixel count of the brightness scale exceeds the predetermined count threshold, the brightness scale is counted one unit of the histogram width. That is, the histogram width is a total number of brightness scales between the histogram brightness minimum and the histogram brightness maximum, whose pixel count exceeds the predetermined count threshold. The brightness scale is a scale of brightness to define a sensible range of the sensor device from darkest to brightest. For example, a binary 8-bit definition can define the range in 256 brightness scales, from 0 to 255. In one embodiment, in the histogram, a brightness threshold is predetermined, and brightness scales lower than the brightness threshold is not eligible for determining the histogram brightness maximum, the histogram brightness minimum, and the histogram width. FIG. 2C shows an example of the relationship between the brightness and the exposure time. In this example, the relationship between the brightness and the exposure time is set linear, for purpose of easier estimation by for example extrapolation, interpolation, and other linear operations.

According to the present invention, for example by using an apparatus shown in FIG. 2A and a method indicated by FIGS. 2A-2B, the first histogram and the second histogram are obtained according to the first exposure time and the second exposure time respectively, and the first histogram width and the second histogram width are obtained according to the first histogram and the second histogram respectively. The third exposure time is obtained according to the first histogram width and the second histogram width. Then, by sensing the fingerprint image according to the third exposure time, a better fingerprint image picture compared to the prior art is obtained.

Figure 3:
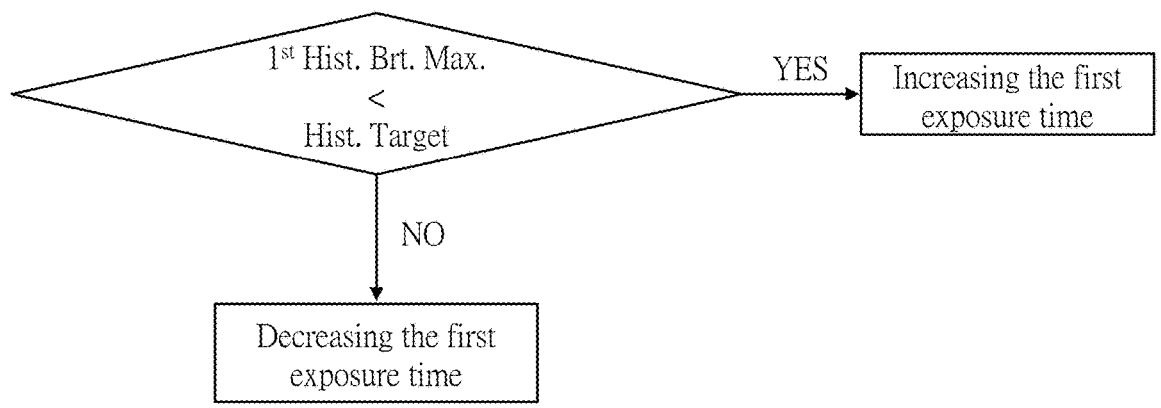
FIG. 3 shows a second embodiment of the present invention.

FIG. 3 shows a second embodiment according to the present invention. This embodiment is an example illustrating how to determine to increase or decrease the first exposure time in the step S3. As shown in the figure, when the first histogram brightness maximum (1st Hist. Brt. Max.) is less than a histogram target (Hist. Target), the first exposure time (Tint1) is determined to be increased to generate the second exposure time (Tint2) in the step S3. That is, when the first histogram brightness maximum (1st Hist. Brt. Max.) is less than the histogram target (Hist. Target), it is determined that the highest brightness scale whose pixel count exceeds the count threshold is too low, and the exposure time should be increased to increase the highest brightness scale.

On the other hand, when the 1st Hist. Brt. Max. is not less than the Hist. Target, the first exposure time is determined to be decreased to generate the second exposure time in the step S3. That is, when the 1st Hist. Brt. Max. is not less than the Hist. Target, it is determined that the highest brightness scale whose pixel count exceeds the count threshold is too high, and the exposure time should be decreased to decrease the highest brightness scale. The second exposure time of the second stage exposure condition is obtained by increasing or decreasing the first exposure time of the first stage exposure condition. There are various ways to determine the second exposure time according to the first exposure time, such as increasing or decreasing the first exposure time by one predetermined unit time period.

Figure 4:
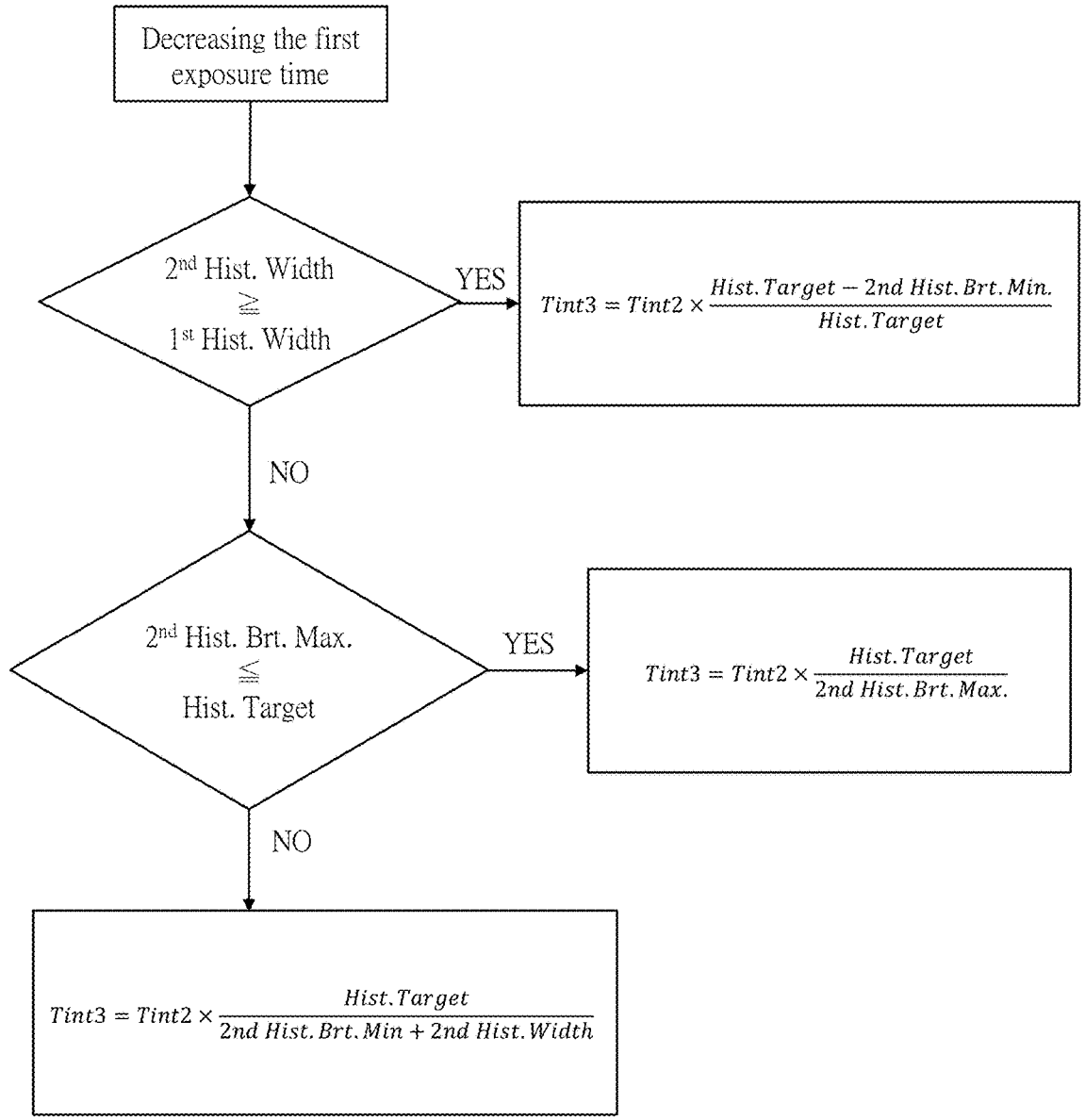
FIG. 4 shows a third embodiment of the present invention.

FIG. 4 shows a third embodiment according to the present invention. As shown in the figure, in this embodiment, it is determined in the step S3 that the first exposure time Tint1 should be decreased to the second exposure time Tint2 as the second stage exposure condition, and the image is sensed according to the second stage exposure condition to generate the second histogram brightness maximum, the second histogram brightness minimum, and the second histogram width. When the second histogram width ($2^{nd}$ Hist. Width) is not less than the first histogram width ($1^{st}$ Hist. Width), the third exposure time Tint3 is determined to be the third stage exposure condition for sensing the image, wherein the third exposure time Tint3 is positively correlated to (for example, equal to) an operation result of: subtracting the second histogram brightness minimum (2nd Hist. Brt. Min.) from a histogram target (Hist. Target) to obtain a difference, and dividing the difference by the histogram target (Hist. Target) to obtain a quotient, and multiplying the quotient by the second exposure time Tint2. More specifically, when the 1st Hist. Brt. Max. is not less than the Hist. Target, it is determined that the highest brightness scale whose pixel count exceeds the count threshold is too high, and the first exposure time should be decreased to generate the second exposure time Tint2 in the step S3, so as to decrease the highest brightness scale. The second exposure time Tint2 of the second stage exposure condition is obtained by decreasing the first exposure time Tint1 of the first stage exposure condition. And when the $2^{nd}$ Hist. Width is not less than the $1^{st}$ Hist. Width, the Hist. Target is subtracted by the $2^{nd}$ Hist. Brt. Min. to obtain a difference, and the difference is divided by the Hist. Target to obtain a quotient, and the quotient is multiplied by the second exposure time Tint2 to generate the third exposure time Tint3.

Still referring FIG. 4, as shown in the figure, it is determined in the step S3 that the first exposure time Tint1 should be decreased to the second exposure time Tint2 as the second stage exposure condition, and the image is sensed according to the second stage exposure condition to generate the second histogram brightness maximum, the second histogram brightness minimum, and the second histogram width. When the second histogram width ($2^{nd}$ Hist. Width) is less than the first histogram width ($1^{st}$ Hist. Width), and the second histogram maximum ($2^{nd}$ Hist. Max.) is not larger than the Hist. Target, the third exposure time Tint3 is determined to be the third stage exposure condition for sensing the image, wherein the third exposure time Tint3 is positively correlated to (for example, equal to) an operation result of: dividing the histogram target (Hist. Target) by the second histogram brightness maximum (2nd Hist. Brt. Max.) to obtain a quotient, and multiplying the quotient by the second exposure time Tint2. More specifically, when the 1st Hist. Brt. Max. is not less than the Hist. Target, it is determined that the highest brightness scale whose pixel count exceeds the count threshold is too high, and the first exposure time should be decreased to generate the second exposure time Tint2 in the step S3, so as to decrease the highest brightness scale. The second exposure time Tint2 of the second stage exposure condition is obtained by decreasing the first exposure time Tint1 of the first stage exposure condition. And when the $2^{nd}$ Hist. Width is less than the $1^{st}$ Hist. Width, and the $2^{nd}$ Hist. Brt. Max. is not larger than the Hist. Target, the Hist. Target is divided by the $2^{nd}$ Hist. Brt. Max. to obtain a quotient, and the quotient is multiplied by the second exposure time Tint2 to generate the third exposure time Tint3.

Still referring FIG. 4, as shown in the figure, it is determined in the step S3 that the first exposure time Tint1 should be decreased to the second exposure time Tint2 as the second stage exposure condition, and the image is sensed according to the second stage exposure condition to generate the second histogram brightness maximum, the second histogram brightness minimum, and the second histogram width. When the second histogram width ($2^{nd}$ Hist. Width) is less than the first histogram width ($1^{st}$ Hist. Width), and the second histogram maximum ($2^{nd}$ Hist. Max.) is larger than the Hist. Target, the third exposure time Tint3 is determined to be the third stage exposure condition for sensing the image, wherein the third exposure time Tint3 is positively correlated to (for example, equal to) an operation result of: dividing the histogram target (Hist. Target) by a sum of the second histogram brightness maximum (2nd Hist. Brt. Min.) and the $2^{nd}$ Hist. Width to obtain a quotient, and multiplying the quotient by the second exposure time Tint2. More specifically, when the 1st Hist. Brt. Max. is not less than the Hist. Target, it is determined that the highest brightness scale whose pixel count exceeds the count threshold is too high, and the first exposure time should be decreased to generate the second exposure time Tint2 in the step S3, so as to decrease the highest brightness scale. The second exposure time Tint2 of the second stage exposure condition is obtained by decreasing the first exposure time Tint1 of the first stage exposure condition. When the $2^{nd}$ Hist. Width is less than the $1^{st}$ Hist. Width, and the $2^{nd}$ Hist. Brt. Max. is larger than the Hist. Target, the Hist. Target is divided by the sum of the $2^{nd}$ Hist. Brt. Min. and the $2^{nd}$ Hist. Width to obtain a quotient, and the quotient is multiplied by the second exposure time Tint2 to generate the third exposure time Tint3.

Figure 5:
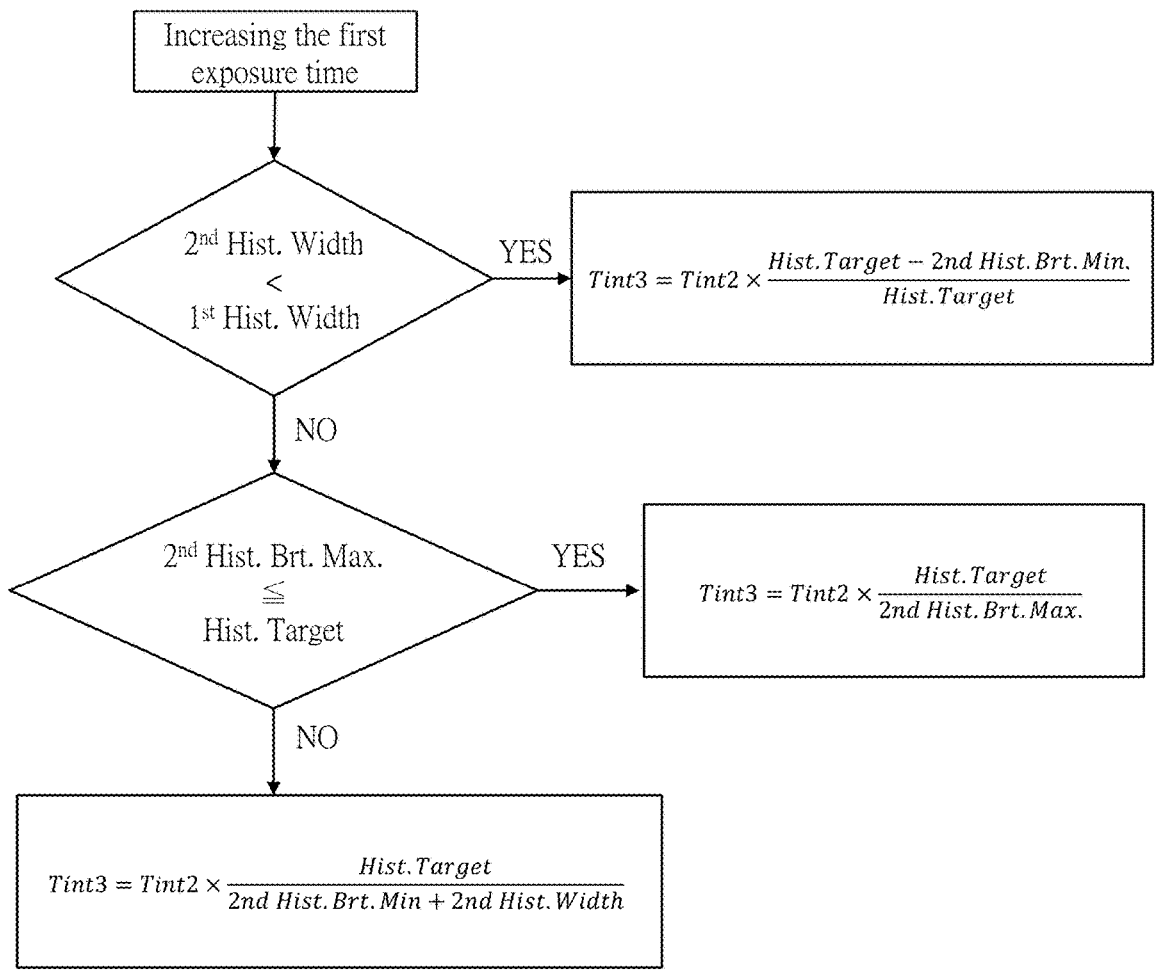
FIG. 5 shows a fourth embodiment of the present invention.

FIG. 5 shows a fourth embodiment of the present invention. As shown in the figure, it is determined in the step S3 that the first exposure time Tint1 should be increased to the second exposure time Tint2 as the second stage exposure condition, and the image is sensed according to the second stage exposure condition to generate the second histogram brightness maximum, the second histogram brightness minimum, and the second histogram width. When the second histogram width ($2^{nd}$ Hist. Width) is less than the first histogram width ($1^{st}$ Hist. Width), the third exposure time Tint3 is determined to be the third stage exposure condition for sensing the image, wherein the third exposure time Tint3 is positively correlated to (for example, equal to) an operation result of: subtracting the second histogram brightness minimum (2nd Hist. Brt. Min.) from a histogram target (Hist. Target) to obtain a difference, and dividing the difference by the histogram target (Hist. Target) to obtain a quotient, and multiplying the quotient by the second exposure time Tint2. More specifically, when the 1st Hist. Brt. Max. is less than the Hist. Target, it is determined that the highest brightness scale whose pixel count exceeds the count threshold is too low, and the first exposure time should be increased to generate the second exposure time Tint2 in the step S3, so as to increase the highest brightness scale. The second exposure time Tint2 of the second stage exposure condition is obtained by increasing the first exposure time Tint1 of the first stage exposure condition. When the $2^{nd}$ Hist. Width is less than the $1^{st}$ Hist. Width, the Hist. Target is subtracted by the $2^{nd}$ Hist. Brt. Min. to obtain a difference, and the difference is divided by the Hist. Target to obtain a quotient, and the quotient is multiplied by the second exposure time Tint2 to generate the third exposure time Tint3.

Still referring FIG. 5, as shown in the figure, it is determined in the step S3 that the first exposure time Tint1 should be increased to the second exposure time Tint2 as the second stage exposure condition, and the image is sensed according to the second stage exposure condition to generate the second histogram brightness maximum, the second histogram brightness minimum, and the second histogram width. When the second histogram width ($2^{nd}$ Hist. Width) is not less than the first histogram width ($1^{st}$ Hist. Width), and the second histogram maximum ($2^{nd}$ Hist. Max.) is not larger than the Hist. Target, the third exposure time Tint3 is determined to be the third stage exposure condition for sensing the image, wherein the third exposure time Tint3 is positively correlated to (for example, equal to) an operation result of: dividing the histogram target (Hist. Target) by the second histogram brightness maximum (2nd Hist. Brt. Max.) to obtain a quotient, and multiplying the quotient by the second exposure time Tint2. More specifically, when the 1st Hist. Brt. Max. is less than the Hist. Target, it is determined that the highest brightness scale whose pixel count exceeds the count threshold is too low, and the first exposure time should be increased to generate the second exposure time Tint2 in the step S3, so as to increase the highest brightness scale. The second exposure time Tint2 of the second stage exposure condition is obtained by increasing the first exposure time Tint1 of the first stage exposure condition. When the $2^{nd}$ Hist. Width is not less than the $1^{st}$ Hist. Width, the Hist. Target is divided by the $2^{nd}$ Hist. Brt. Max. to obtain a quotient, and the quotient is multiplied by the second exposure time Tint2 to generate the third exposure time Tint3.

Still referring FIG. 5, as shown in the figure, it is determined in the step S3 that the first exposure time Tint1 should be increased to the second exposure time Tint2 as the second stage exposure condition, and the image is sensed according to the second stage exposure condition to generate the second histogram brightness maximum, the second histogram brightness minimum, and the second histogram width. When the second histogram width ($2^{nd}$ Hist. Width) is not less than the first histogram width ($1^{st}$ Hist. Width), and the second histogram maximum ($2^{nd}$ Hist. Max.) is larger than the Hist. Target, the third exposure time Tint3 is determined to be the third stage exposure condition for sensing the image, wherein the third exposure time Tint3 is positively correlated to (for example, equal to) an operation result of: dividing the histogram target (Hist. Target) by a sum of the second histogram brightness maximum (2nd Hist. Brt. Max.) and the $2^{nd}$ Hist. Width to obtain a quotient, and multiplying the quotient by the second exposure time Tint2. More specifically, when the 1st Hist. Brt. Max. is less than the Hist. Target, it is determined that the highest brightness scale whose pixel count exceeds the count threshold is too low, and the first exposure time should be increased to generate the second exposure time Tint2 in the step S3, so as to increase the highest brightness scale. The second exposure time Tint2 of the second stage exposure condition is obtained by increasing the first exposure time Tint1 of the first stage exposure condition. When the $2^{nd}$ Hist. Width is not less than the $1^{st}$ Hist. Width, the Hist. Target is divided by a sum of the $2^{nd}$ Hist. Brt. Min. and the $2^{nd}$ Hist. Width to obtain a quotient, and the quotient is multiplied by the second exposure time Tint2 to generate the third exposure time Tint3.

Figure 6:
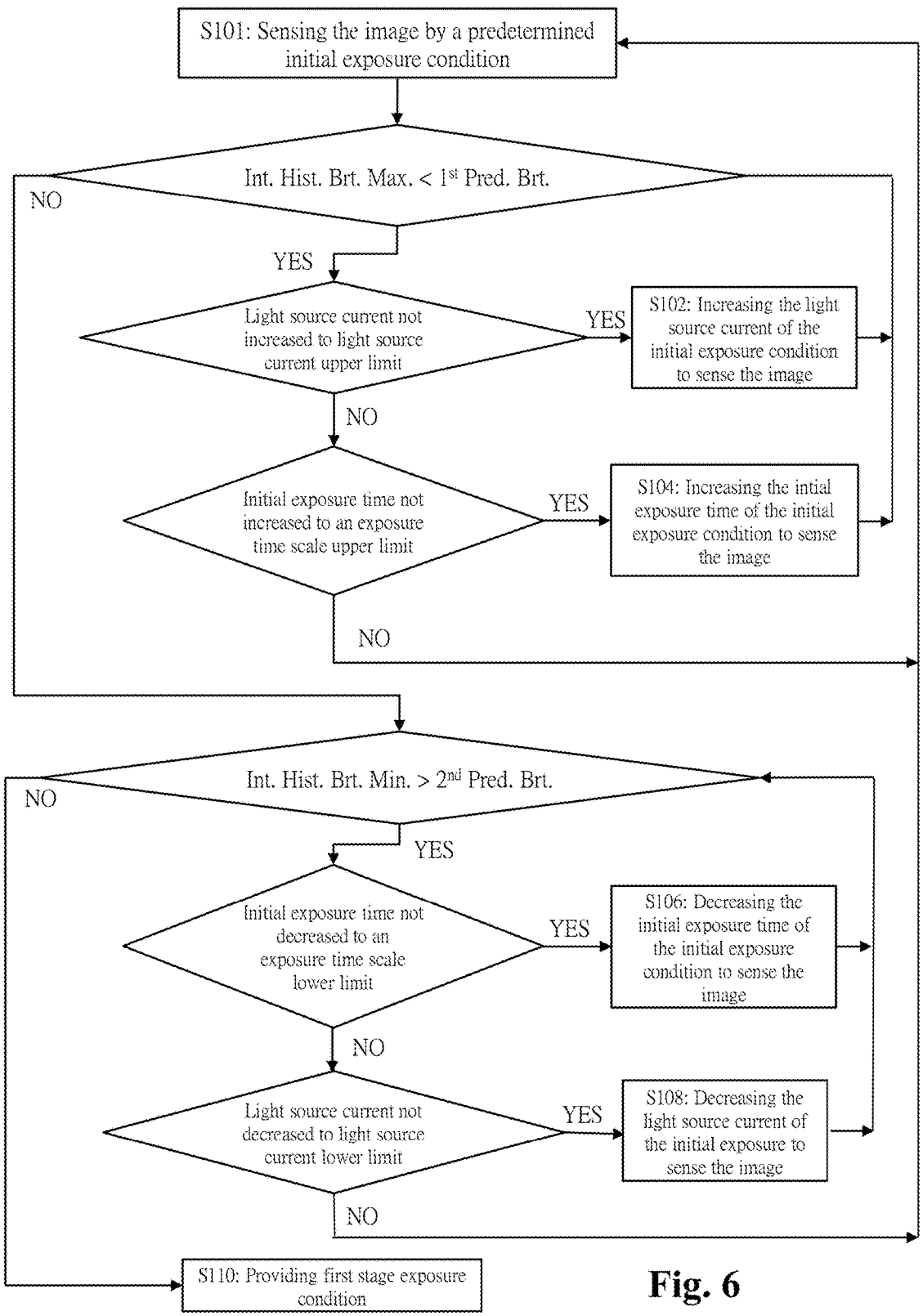
FIG. 6 shows a fifth embodiment of the present invention.

FIG. 6 shows a fifth embodiment of the present invention. This embodiment is an example illustrating how a pre-process determines the first exposure time of the first stage exposure condition. As shown in the figure, the process of providing the first stage exposure condition, includes the steps of:

S101: sensing the image by a predetermined initial exposure condition which includes a condition of a light source current and a condition of an initial exposure time, to generate an initial histogram brightness maximum, an initial histogram brightness minimum, and an initial histogram width;

S102: when the initial histogram brightness maximum (Int. Hist. Brt. Max.) is less than a first predetermined brightness scale (1st Pred. Brt.), and the light source current is not increased to a light source current upper limit, increasing the light source current as an updated initial exposure condition to sense the image, so as to update the initial histogram brightness maximum, the initial histogram brightness minimum, and the initial histogram width;

S103: repeating the step S102, until the initial histogram brightness maximum is not less than the first predetermined brightness scale or the light source current is increased to the light source current upper limit;

S104: when the light source current is increased to the light source current upper limit and the initial histogram brightness maximum is less than the first predetermined brightness scale, and the initial exposure time is not increased to an exposure time scale upper limit, increasing the initial exposure time as an updated initial exposure condition to sense the image, so as to update the initial histogram brightness maximum, initial histogram brightness minimum, and initial histogram width;

S105: repeating the step S104, until the initial histogram brightness maximum is not less than the first predetermined brightness scale or the initial exposure time is increased to the exposure time scale upper limit;

S106: when the initial histogram brightness minimum (Int. Hist. Brt. Min.) is larger than a second predetermined brightness scale (2nd Pred. Brt.), and the initial exposure time is not decreased to an exposure time scale lower limit, decreasing the initial exposure time as an updated initial exposure condition to sense the image, so as to update the initial histogram brightness maximum, initial histogram brightness minimum, and initial histogram width;

S107: repeating the step S106, until the initial histogram brightness minimum is not larger than the second predetermined brightness scale or the initial exposure time is decreased to the exposure time scale lower limit;

S108: when the initial exposure time is decreased to the exposure time scale lower limit, and the initial histogram brightness minimum is larger than the second predetermined brightness scale, and the light source current is not decreased to a light source current lower limit, decreasing the light source current as the updated initial exposure condition to sense the image, so as to update the initial histogram brightness maximum, initial histogram brightness minimum, and initial histogram width;

S109: repeating the step S108, until the initial histogram brightness minimum is not larger than the second predetermined brightness scale or the light source current is decreased to the light source current lower limit; and S110: when the steps S103, S105, and S109 are completed, using the updated initial exposure condition as the first stage exposure condition.

The light source current is a current flowing through a light source for emitting light to, for example but not limited to, the aforementioned finger in the first embodiment. The light source is for example but not limited to the aforementioned LED device. As shown in FIG. 6, the objective of the pre-process is to determine the first stage exposure condition, which includes the light source current and the first exposure time such that the initial histogram brightness maximum reaches the first predetermined brightness scale, and the initial histogram brightness minimum is not larger than the second predetermined brightness scale. In one preferable embodiment, the adjustment scale of one step of the initial exposure time is larger than the adjustment scale of one step of the change (increase or decrease) from the first exposure time to the second exposure time, such as two times to ten times.

Figure 7:
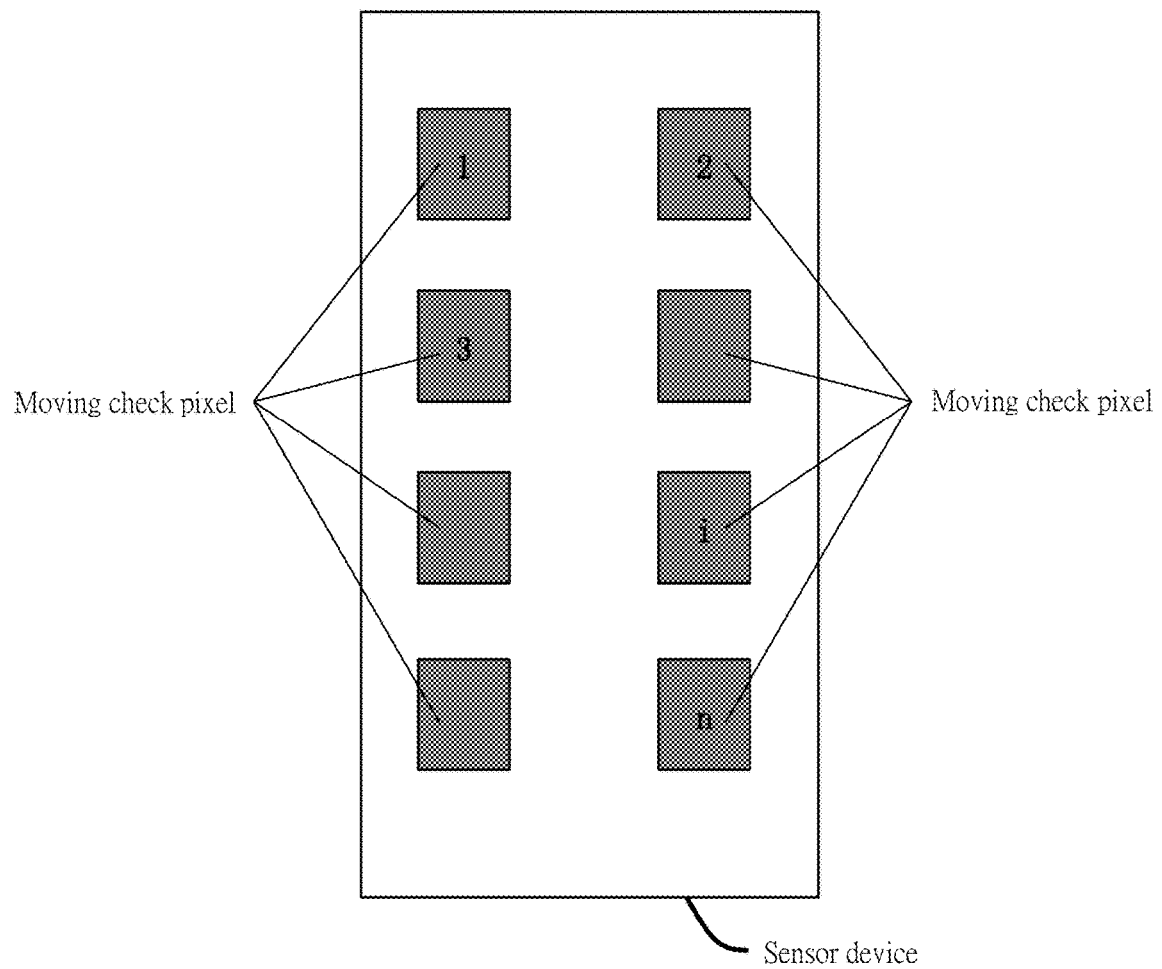
FIG. 7 shows a sixth embodiment of the present invention.

FIG. 7 shows a sixth embodiment of the present invention. This embodiment indicates that the exposure time determination method according to the present invention can further include the following steps: at a first time point, sensing the image by at least one moving check pixel of a sensor device with the third stage exposure condition, to obtain at least one first brightness scale of the at least one moving check pixel; at a second time point after the first time point, sensing the image by the at least one moving check pixel of the sensor device with the third stage exposure condition, to obtain at least one second brightness scale of the at least one moving check pixel; and determining a moving stability according to the at least one first brightness scale and the at least one second brightness scale.

That is, in the sensor device, at least one pixel is selected as the moving check pixel; in the example shown in FIG. 7, n moving check pixels of the sensor device are selected. At the first time point, the n moving check pixels of the sensor device sense the image with the third stage exposure condition, to obtain n first brightness scales corresponding to the n moving check pixels. Next, at the second time point after the first time point, the n moving check pixels of the sensor device sense the image with the third stage exposure condition again, to obtain n second brightness scales corresponding to the n moving check pixels. Next, by comparing the n first brightness scales and the n second brightness scales, moving stability is determined. In one embodiment, a moving stability threshold is predetermined, and when the image is sensed with the third stage exposure condition and it is determined that the moving stability is lower than the moving stability threshold, the third stage exposure condition is used; while, if it is determined that the moving stability is higher than the moving stability threshold, the third stage exposure condition will be re-determined; for example, the process can return to the step S1 or step 101.

There are various methods to determine the moving stability under the spirit of the present invention, and any method to determine the moving stability according to the at least one first brightness scale and the at least one second brightness scale is within the scope of the present invention. For example, in one embodiment, the first brightness scales are compared with the corresponding second brightness scales respectively, and when the absolute differences of all the comparison results are less than a threshold, the moving stability is determined to be lower than the moving stability threshold, and the image will be sensed by the third stage exposure condition. When any absolute difference of the comparison results are not less than the threshold, the moving stability is determined to be higher than the moving stability threshold, and the image will not be sensed by the third stage exposure condition. For another example, the moving stability is defined as a sum of the absolute differences between the first brightness scales and the corresponding second brightness scales; when the moving stability is lower than the moving stability threshold, the image will be sensed by the third stage exposure condition, and when the moving stability is not lower than the moving stability threshold, the image will not be sensed by the third stage exposure condition. The sum of the absolute differences can be expressed by the equation shown below:

$$d = \sum_{i=1}^{n} |P_t(i) - P_{t+1}(i)|$$

wherein d is the sum of absolute differences, i indicates the ith moving check pixel, p is the brightness scale, t indicates the first time point, and t+1 indicates the second time point.

In a preferable embodiment, the first predetermined brightness scale and the second predetermined brightness scale are the same, and both are a predetermined middle brightness scale. For example, The pixel brightness scales are from 0 to 255 (total 256 scales), and the predetermined middle brightness scale is 128, that is, the first predetermined brightness scale and the second predetermined brightness scale are both 128.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device or circuit which does not substantially influence the primary function of a signal can be inserted between any two devices or circuits in the shown embodiments, so the term "couple" should include direct and indirect connections. For another example, it is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. For example, the method of determining increasing or decreasing the first exposure time in the step S3 shown in FIG. 3 can be applied to all other embodiments. For another example, the embodiments shown in FIGS. 2, 4, 5, 6, 7 can be applied to all other embodiments. In view of the foregoing, the spirit of the present invention should cover all such and other modifications and variations, which should be interpreted to fall within the scope of the following claims and their equivalents.

What is claimed is:

1. An exposure time determination method for image sensing operation, comprising:
   S1: providing a first stage exposure condition which includes a first exposure time;
   S2: sensing an image according to the first stage exposure condition, and generating a first histogram according to brightness distribution and pixel counts of different brightness scales of the image, and determining a first histogram brightness maximum, a first histogram brightness minimum, and a first histogram width according to the first histogram, wherein the first histogram width is a total number of brightness scales having a pixel count exceeding a count threshold between the first histogram brightness maximum and the first histogram brightness minimum;
   S3: increasing or decreasing the first exposure time to a second exposure time as a second stage exposure condition, and sensing the image according to the second stage exposure condition, to generate a second histogram and determining a second histogram brightness maximum, a second histogram brightness minimum, and a second histogram width according to the second histogram, wherein the second histogram width is a total number of brightness scales having a pixel count exceeding the count threshold between the second histogram brightness maximum and the second histogram brightness minimum;

S4: comparing the first histogram width with the second histogram width to generate a comparison result, and determining a third exposure time to be a third stage exposure condition according to the comparison result; and S5: sensing the image according to the third stage exposure condition.

2. The exposure time determination method of claim 1, wherein in the step S3, the first exposure time is decreased to the second exposure time as the second stage exposure condition, and in the step S4, when the comparison result shows that the second histogram width is not less than the first histogram width, the third exposure time is determined to be positively correlated to an operation result of: subtracting the second histogram brightness minimum from a histogram target to obtain a difference, dividing the difference by the histogram target to obtain a quotient, and multiplying the quotient by the second exposure time to generate the operation result.

3. The exposure time determination method of claim 1, wherein in the step S3, the first exposure time is decreased to the second exposure time as the second stage exposure condition, and in the step S4, when the comparison result shows that the second histogram width is less than the first histogram width, and the second histogram brightness maximum is not larger than a histogram target, the third exposure time is determined to be positively correlated to an operation result of: dividing the histogram target by the second histogram brightness maximum to obtain a quotient, and multiplying the quotient by the second exposure time.

4. The exposure time determination method of claim 1, wherein in the step S3, the first exposure time is decreased to the second exposure time as the second stage exposure condition, and in the step S4, when the comparison result shows that the second histogram width is less than the first histogram width, and the second histogram brightness maximum is larger than a histogram target, the third exposure time is determined to be positively correlated to an operation result of: dividing the histogram target by a sum of the second histogram brightness minimum and the second histogram width to obtain a quotient, and multiplying the quotient by the second exposure time.

5. The exposure time determination method of claim 1, wherein in the step S3, the first exposure time is increased to the second exposure time as the second stage exposure condition, and in the step S4, when the comparison result shows that when the second histogram width is less than the first histogram width, the third exposure time is determined to be positively correlated to an operation result of: subtracting the second histogram brightness minimum from a histogram target to obtain a difference, and dividing the difference by the histogram target to obtain a quotient, and multiplying the quotient by the second exposure time.

6. The exposure time determination method of claim 1, wherein in the step S3, the first exposure time is increased to the second exposure time as the second stage exposure condition, and in the step S4, when the comparison result shows that the second histogram width is not less than the first histogram width, and the second histogram brightness maximum is not larger than a histogram target, the third exposure time is determined to be positively correlated to an operation result of: dividing the histogram target by the second histogram brightness maximum to obtain a quotient, and multiplying the quotient by the second exposure time.

7. The exposure time determination method of claim 1, wherein in the step S3, the first exposure time is increased to the second exposure time as the second stage exposure condition, and in the step S4, when the comparison result shows that the second histogram width is not less than the first histogram width, and the second histogram brightness maximum is larger than a histogram target, the third exposure time is determined to be positively correlated to an operation result of: dividing the histogram target by a sum of the second histogram brightness minimum and the second histogram width to obtain a quotient, and multiplying the quotient by the second exposure time.

8. The exposure time determination method of claim 1, wherein the step S1 includes:

S101: sensing the image by a predetermined initial exposure condition which includes a condition of a light source current and a condition of an initial exposure time, to generate an initial histogram brightness maximum, an initial histogram brightness minimum, and an initial histogram width;

S102: when the initial histogram brightness maximum is less than a first predetermined brightness scale, and the light source current is not increased to a light source current upper limit, increasing the light source current as an updated initial exposure condition to sense the image, so as to update the initial histogram brightness maximum, the initial histogram brightness minimum, and the initial histogram width;

S103: repeating the step S102, until the initial histogram brightness maximum is not less than the first predetermined brightness scale or the light source current is increased to the light source current upper limit;

S104: when the light source current is increased to the light source current upper limit and the initial histogram brightness maximum is less than the first predetermined brightness scale, and the initial exposure time is not increased to an exposure time scale upper limit, increasing the initial exposure time as an updated initial exposure condition to sense the image, so as to update the initial histogram brightness maximum, initial histogram brightness minimum, and initial histogram width;

S105: repeating the step S104, until the initial histogram brightness maximum is not less than the first predetermined brightness scale or the initial exposure time is increased to the exposure time scale upper limit;

S106: when the initial histogram brightness minimum is larger than a second predetermined brightness scale, and the initial exposure time is not decreased to an exposure time scale lower limit, decreasing the initial exposure time as an updated initial exposure condition to sense the image, so as to update the initial histogram brightness maximum, initial histogram brightness minimum, and initial histogram width;

S107: repeating the step S106, until the initial histogram brightness minimum is not larger than the second predetermined brightness scale or the initial exposure time is decreased to the exposure time scale lower limit;

S108: when the initial exposure time is decreased to the exposure time scale lower limit, and the initial histogram brightness minimum is larger than the second predetermined brightness scale, and the light source current is not decreased to a light source current lower limit, decreasing the light source current as the updated initial exposure condition to sense the image, so as to update the initial histogram brightness maximum, initial histogram brightness minimum, and initial histogram width;

S109: repeating the step S108, until the initial histogram brightness minimum is not larger than the second predetermined brightness scale or the light source current is decreased to the light source current lower limit; and S110: when the steps S103, S105, and S109 are completed, using the updated initial exposure condition as the first stage exposure condition.

9. The exposure time determination method of claim 1, further comprising:
at a first time point, sensing the image by at least one moving check pixel of a sensor device with the third stage exposure condition, to obtain at least one first brightness scale of the at least one moving check pixel;
at a second time point after the first time point, sensing the image by the at least one moving check pixel of the sensor device with the third stage exposure condition, to obtain at least one second brightness scale of the at least one moving check pixel; and
determining a moving stability according to the at least one first brightness scale and the at least one second brightness scale.

10. The exposure time determination method of claim 9, further comprising: determining the moving stability according to a sum of absolute differences of a plurality of the first brightness scales and a plurality of the second brightness scales.

11. The exposure time determination method of claim 8, wherein both the first predetermined brightness scale and the second predetermined brightness scale are equal to a predetermined middle brightness scale in a sensible range of a sensor device.

12. The exposure time determination method of claim 1, further comprising: determining to increase or decrease the first exposure time according to the first histogram brightness maximum and a histogram target in the step S3.

* * * * *